(12) United States Patent
Ko

(10) Patent No.: US 10,602,732 B2
(45) Date of Patent: Mar. 31, 2020

(54) COCKROACH TRAP

(71) Applicant: Chen-Tung Ko, Taichung (TW)

(72) Inventor: Chen-Tung Ko, Taichung (TW)

( * ) Notice: Subject to any disclaimer, the term of this patent is extended or adjusted under 35 U.S.C. 154(b) by 195 days.

(21) Appl. No.: 15/990,087

(22) Filed: May 25, 2018

(65) Prior Publication Data

US 2018/0271081 A1    Sep. 27, 2018

(51) Int. Cl.
*A01M 1/10* (2006.01)
*A01M 1/02* (2006.01)

(52) U.S. Cl.
CPC .............. *A01M 1/103* (2013.01); *A01M 1/02* (2013.01); *A01M 1/026* (2013.01)

(58) Field of Classification Search
CPC ........ A01M 1/103; A01M 1/02; A01M 1/026; A01M 1/10
USPC ........................................................... 43/133
See application file for complete search history.

(56) References Cited

U.S. PATENT DOCUMENTS

| | | | | | |
|---|---|---|---|---|---|
| 2,873,551 | A | * | 2/1959 | Misko | A01M 1/2005 43/111 |
| 4,835,900 | A | * | 6/1989 | Shifflett | A01M 1/026 43/58 |
| 5,930,944 | A | * | 8/1999 | Knuppel | A01M 1/026 43/114 |
| 2002/0023382 | A1 | * | 2/2002 | Snell | A01M 1/026 43/132.1 |
| 2002/0083639 | A1 | * | 7/2002 | Perry | A01M 1/026 43/114 |
| 2006/0032110 | A1 | * | 2/2006 | Yang | A01M 1/026 43/60 |
| 2008/0148624 | A1 | * | 6/2008 | Borth | G01N 33/68 43/131 |
| 2013/0219771 | A1 | * | 8/2013 | Black | A01M 1/02 43/114 |
| 2015/0216158 | A1 | * | 8/2015 | Mizrach | A01M 1/2016 43/107 |
| 2017/0196213 | A1 | * | 7/2017 | Addis | A01M 1/026 |
| 2018/0027795 | A1 | * | 2/2018 | Janet | A01M 1/026 |

FOREIGN PATENT DOCUMENTS

| | | | | |
|---|---|---|---|---|
| CA | 2342995 A1 | * | 2/2001 | ......... A01M 1/2011 |
| EP | 2781155 A2 | * | 9/2014 | ......... A01M 1/2011 |
| WO | WO-2017083916 A1 | * | 5/2017 | ......... A01M 1/2011 |
| WO | WO-2019120423 A2 | * | 6/2019 | ............ A01M 1/106 |

* cited by examiner

*Primary Examiner* — Christopher P Ellis

(57) ABSTRACT

A cockroach trap includes a case including an opening and first and second compartments; a guide assembly disposed above the first compartment and including a channel communicating with the opening, and a bossed hole communicating with the channel; an open reservoir releasably disposed in the first compartment; a bait passageway in an upper portion of the reservoir and communicating with both the channel and the reservoir; an entrance sensor disposed proximate the channel; a pivotal trigger disposed above the second compartment and including a projection; and an air canister releasably disposed in the second compartment and including a plunger engaged with the projection, a nozzle, and a line having two ends connected to the nozzle and the bossed hole respectively. After the entrance sensor is activated, the projection presses the plunger to open the nozzle, thereby communicating the nozzle with the air canister.

2 Claims, 7 Drawing Sheets

COCKROACH TRAP

BACKGROUND OF THE INVENTION

1. Field of the Invention

The invention relates to insect bait devices and more particularly to a cockroach trap having improved characteristics.

2. Description of Related Art

A conventional trap for crawling insects comprises an upright container adapted to hold a supply of bait and provided with a lid having an aperture and with a bottom part having a bottom wall formed with an annular upstanding partition which defines in the container an inner and an outer compartment, the lid being provided with a downward extension adjoining the aperture and forming a guide path leading toward the supply of bait but terminating sufficiently short of the bottom wall to prevent an insect attracted by the bait from regaining the extension after landing on the bottom wall, and a slippery coating on the inner peripheral wall of the container for frustrating attempts of the insect to climb the inner peripheral wall; and a moisture-retaining ring of foam-plastic material in one of the compartments.

While the device enjoys its success in the market, continuing improvements in the exploitation of cockroach trap are constantly being sought.

SUMMARY OF THE INVENTION

It is therefore one object of the invention to provide a cockroach trap comprising a case including an opening, a hinged door, a first compartment, and a second compartment; a guide assembly disposed above the first compartment and including a channel having two ends communicating with the opening and the first compartment respectively, and a bossed hole communicating with the channel; an open reservoir releasably disposed in the first compartment and filled with cleaning solution; a bait passageway disposed in an upper portion of the reservoir and communicating with both the channel and the reservoir; an entrance sensor disposed proximate the channel; a pivotal trigger disposed above the second compartment and including a projection; and an air canister releasably disposed in the second compartment and including a plunger engaged with the projection, a nozzle projecting out of the plunger, and a line having one end connected to the nozzle and the other end connected to the bossed hole; wherein in response to an activation of the entrance sensor, the trigger is pivoted and the projection presses the plunger to open the nozzle and communicate the nozzle with inside of the air canister.

The above and other objects, features and advantages of the invention will become apparent from the following detailed description taken with the accompanying drawings.

DETAILED DESCRIPTION OF THE INVENTION

Figure 1:
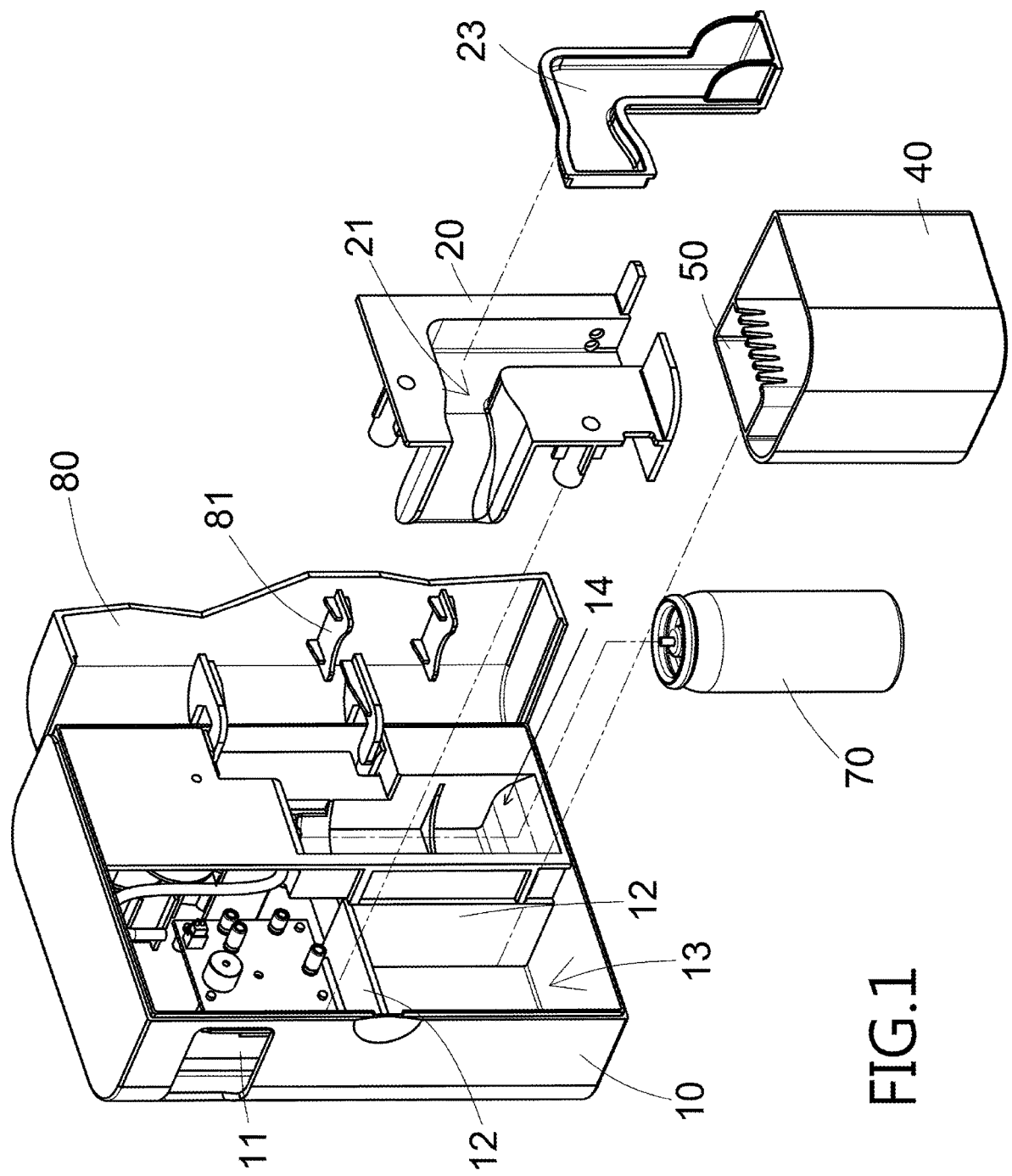
FIG. 1 is an exploded view of a cockroach trap according to the invention.
Figure 2:
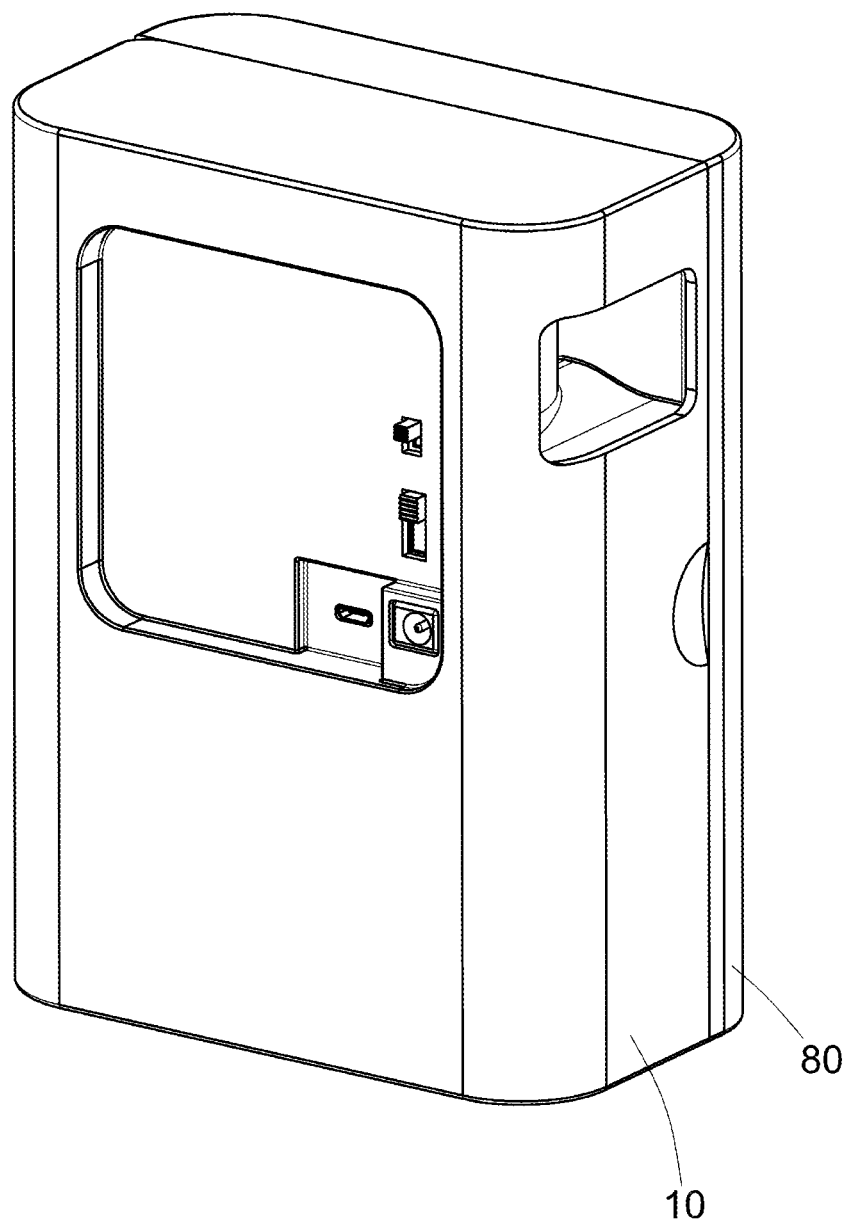
FIG. 2 is a perspective view of the assembled cockroach trap.
Figure 3:
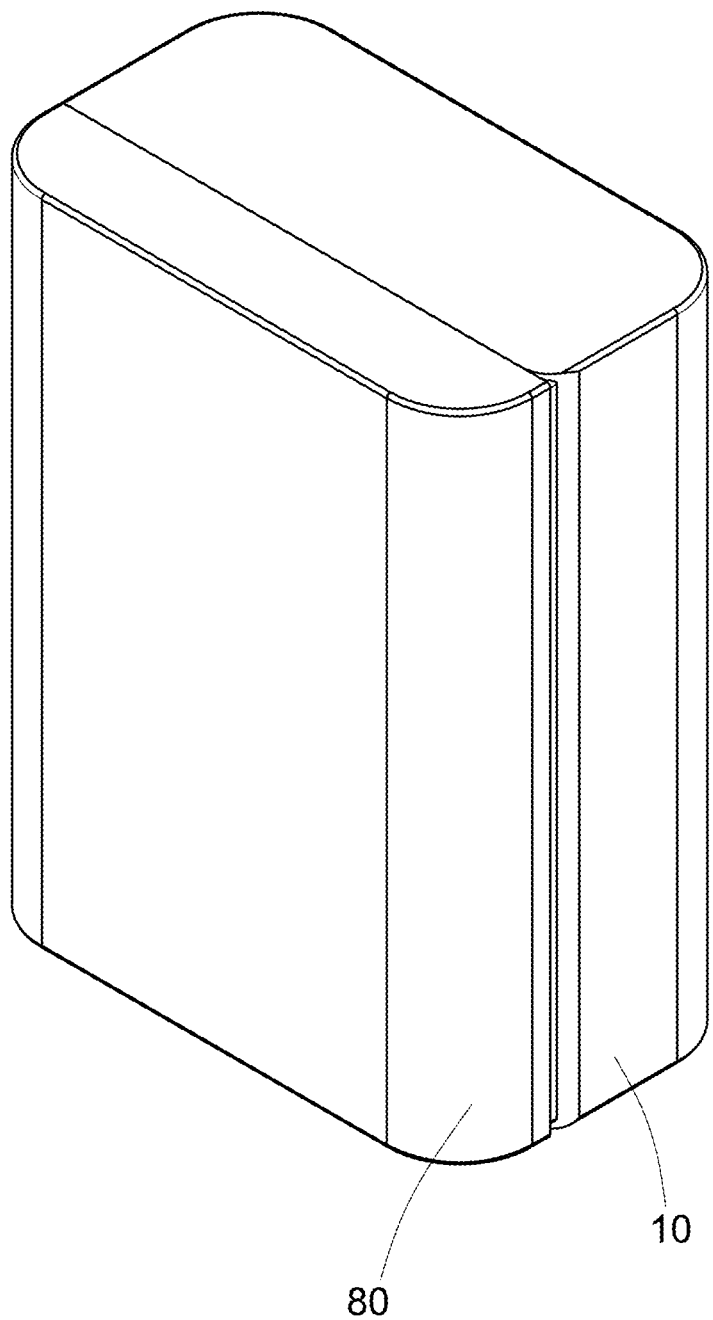
FIG. 3 is another perspective view of the cockroach trap of FIG. 2.
Figure 4:
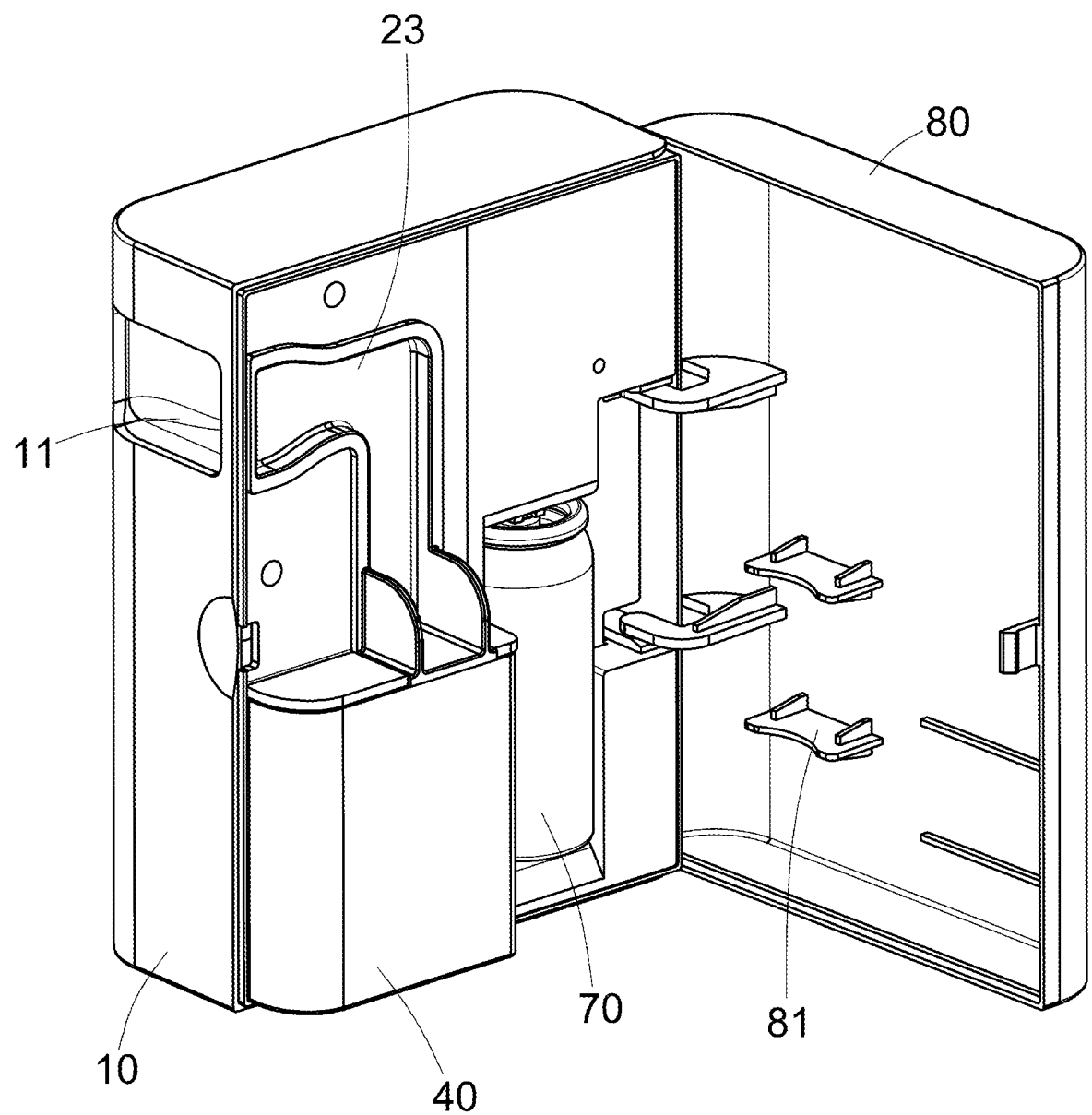
FIG. 4 is a perspective view of the cockroach trap with the door open.
Figure 5:
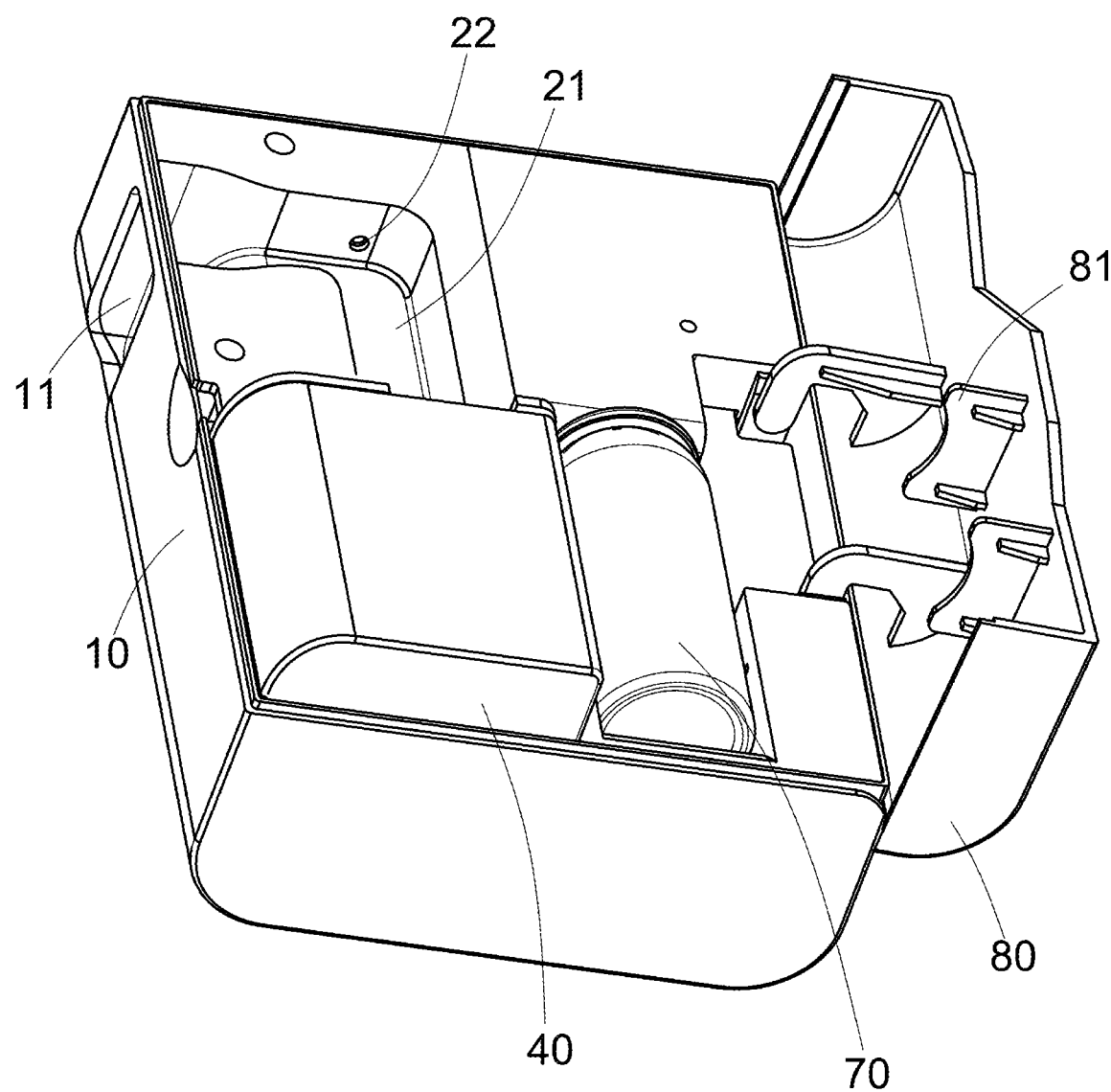
FIG. 5 is another perspective view of the cockroach trap of FIG. 4.

Referring to FIGS. 1 to 7, a cockroach trap in accordance with the invention comprises the following components as discussed in detail below.

An open case 10 includes an opening 11, a plurality of division boards 12, and first and second compartments 13, 14 formed by the division boards 12.

A guide assembly 20 is disposed above the first compartment 13 and includes a channel 21 having two ends communicating with the opening 11 and the first compartment 13 respectively, a bossed hole 22 communicating with the channel 21, and a blocking member 23 releasably, complimentarily disposed in the channel 21.

A reservoir 40 is releasably disposed in the first compartment 13 and filled with cleaning solution 41. The reservoir 40 has an open top communicating with the channel 21. An entrance sensor 30 is disposed proximate a joining portion of the channel 21 and the reservoir 40.

A bait passageway 50 provided with bait is formed in an upper portion of the reservoir 40. A pivotal trigger 60 including a projection 61 is disposed above the second compartment 14. An air canister 70 is releasably disposed in the second compartment 14 and filled with compressed air. The air canister 70 includes a plunger 71 moveably disposed at its open top and engaged with the projection 61, the plunger 71 having a nozzle 711; and a line 72 having one end connected to the nozzle 711 and the other end connected to the bossed hole 22. A door 80 is hingedly secured to the case 10 and includes a plurality of ribs 81 urging against the air canister 70 when the door 80 is closed.

Both the entrance sensor 30 and the trigger 60 are powered by a battery (not shown) or an AC (alternating current) mains supply (not shown).

The blocking member 23 is removed prior to use.

Figure 6:
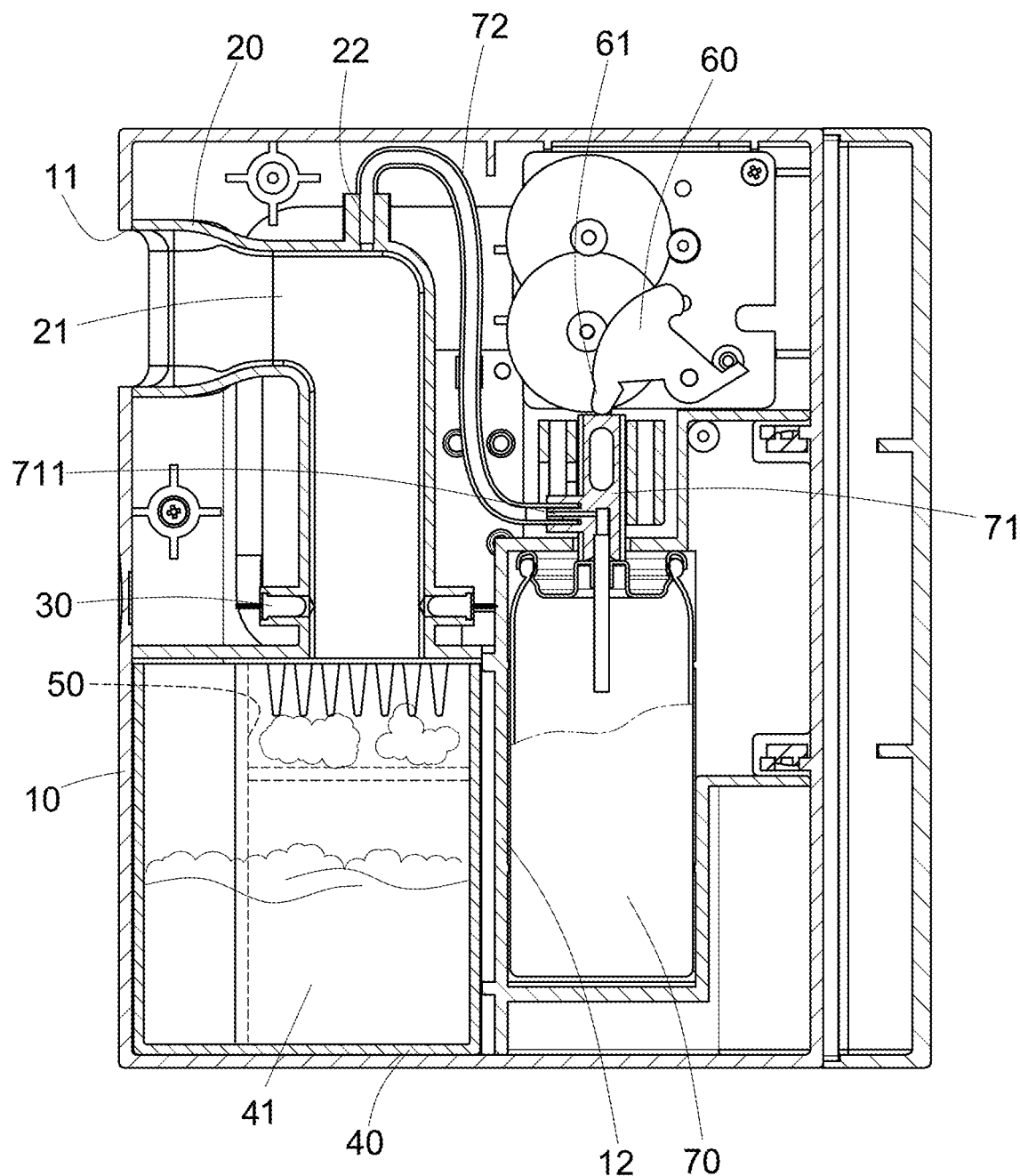
FIG. 6 is a longitudinal sectional view of the cockroach trap prior to trapping cockroaches.
Figure 7:
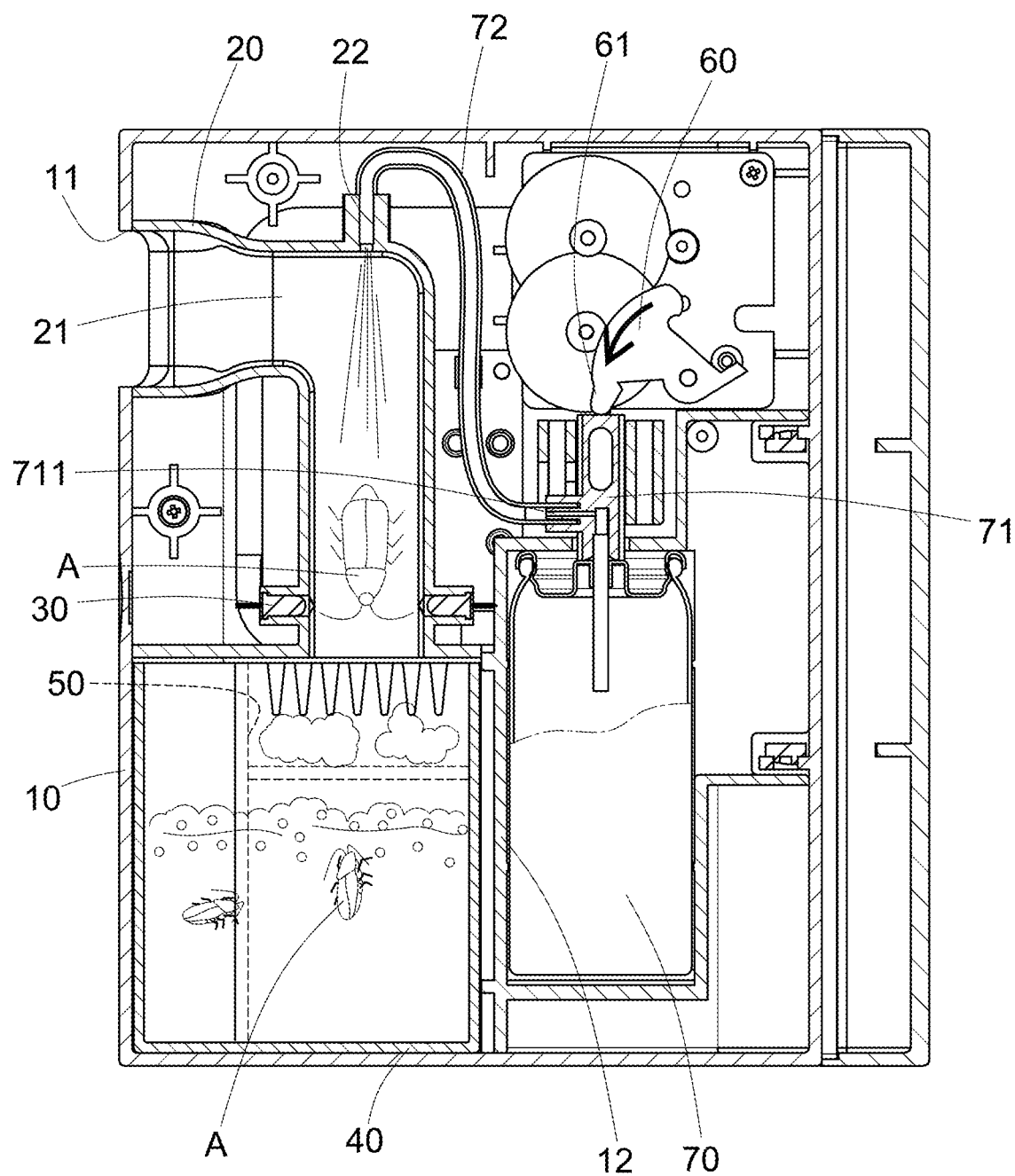
FIG. 7 is a view similar to FIG. 6 showing the cockroaches trapped by the cockroach trap.

As shown in FIGS. 6 and 7 specifically, cockroaches A may be attracted to enter the bait passageway 50 via the channel 21. The entrance sensor 30 can sense the passing cockroaches A and sends a signal to the trigger 60 which in turn is pivoted to urge the projection 61 to press the plunger 71. Further, compressed air in the air canister 70 quickly flows to the channel 21 to frighten the cockroaches A via the nozzle 711 and the line 72. Thus, the cockroaches A run down to fall into the cleaning solution 41 in the reservoir 40 via the bait passageway 50. As an end, the cockroaches A are drowned in the reservoir 40.

After use, an individual may open the door 80 and take out the reservoir 40. Further, the individual may pour the cleaning solution 41 filled with dead cockroaches A into a sink prior to pouring clean cleaning solution 41 into the reservoir 40. Furthermore, the individual may put the blocking member 23 onto the channel 21 in a non-use position to block both the opening 11 and the bait passageway 50.

While the invention has been described in terms of preferred embodiments, those skilled in the art will recognize that the invention can be practiced with modifications within the spirit and scope of the appended claims.

What is claimed is:

1. A cockroach trap, comprising:
a case including an opening, a hinged door, a first compartment, and a second compartment;
a guide assembly disposed above the first compartment and including a channel communicating with the opening, and a bossed hole communicating with the channel;
an open reservoir releasably disposed in the first compartment and filled with cleaning solution;
a bait passageway disposed in an upper portion of the reservoir and communicating with both the channel and the reservoir;
an entrance sensor disposed proximate the channel;
a pivotal trigger disposed above the second compartment and including a projection; and
an air canister releasably disposed in the second compartment and including a plunger engaged with the projection, a nozzle projecting out of the plunger, and a line having one end connected to the nozzle and the other end connected to the bossed hole;
wherein in response to an activation of the entrance sensor, the trigger is pivoted and the projection presses the plunger to open the nozzle and communicate the nozzle with inside of the air canister.

2. The cockroach trap of claim 1, further comprising a blocking member releasably disposed in the channel, wherein the blocking member is configured to dispose in the channel to prevent the channel from communicating with both the opening and the bait passageway in a non-use position.

* * * * *